(12) United States Patent
Hao et al.

(10) Patent No.: US 9,679,401 B2
(45) Date of Patent: Jun. 13, 2017

(54) GENERALIZED SCATTER PLOTS

(75) Inventors: Ming C. Hao, Palo Alto, CA (US);
Umeshwar Dayal, Saratoga, CA (US);
Daniel Keim, Steisslingen (DE);
Halldor Janetzko, Constance (DE);
Walter Hill, Mettmann (DE)

(73) Assignee: Hewlett Packard Enterprise Development LP, Houston, TX (US)

( * ) Notice: Subject to any disclaimer, the term of this patent is extended or adjusted under 35 U.S.C. 154(b) by 1982 days.

(21) Appl. No.: 12/798,257

(22) Filed: Mar. 30, 2010

(65) Prior Publication Data

US 2011/0242106 A1 Oct. 6, 2011

(51) Int. Cl.
*G06T 11/20* (2006.01)

(52) U.S. Cl.
CPC .................. *G06T 11/206* (2013.01)

(58) Field of Classification Search
None
See application file for complete search history.

(56) References Cited

U.S. PATENT DOCUMENTS

| | | | |
|---|---|---|---|
| 6,750,864 B1 | 6/2004 | Anwar | |
| 6,803,924 B1* | 10/2004 | Snibbe et al. | 715/701 |
| 6,944,338 B2 | 9/2005 | Lock et al. | |
| 7,038,680 B2 | 5/2006 | Pitkow | |
| 7,356,184 B2 | 4/2008 | Xi et al. | |
| 7,557,805 B2 | 7/2009 | Wong et al. | |
| 2002/0067358 A1 | 6/2002 | Casari et al. | |
| 2002/0188618 A1 | 12/2002 | Ma et al. | |
| 2003/0035510 A1* | 2/2003 | Strommer | 378/98.8 |
| 2004/0027350 A1 | 2/2004 | Kincaid et al. | |
| 2004/0061702 A1 | 4/2004 | Kincaid | |
| 2006/0206512 A1 | 9/2006 | Hanrahan et al. | |
| 2007/0040094 A1 | 2/2007 | Smith et al. | |
| 2007/0147685 A1 | 6/2007 | Ericson | |
| 2007/0168154 A1 | 7/2007 | Ericson | |
| 2008/0022232 A1 | 1/2008 | McConaghy et al. | |
| 2008/0288445 A1 | 11/2008 | Ames et al. | |
| 2008/0288527 A1 | 11/2008 | Ames et al. | |

(Continued)

FOREIGN PATENT DOCUMENTS

| | | |
|---|---|---|
| EP | 1388801 A2 | 11/2004 |
| EP | 1524612 A2 | 4/2005 |
| WO | 0137120 A2 | 5/2001 |

(Continued)

OTHER PUBLICATIONS

Daniel A. Keim, Christian Panse, Matthias Schäfer, Mike Sips, Stephen C. North, "HistoScale: An Efficient Approach for Computing Pseudo-Cartograms," ieee_vis, pp. 93, 14th IEEE Visualization 2003 (VIS 2003), 2003.*

(Continued)

*Primary Examiner* — Zhengxi Liu

(57) ABSTRACT

Color cell-based data placement systems, methods, and computer-readable storage media that visualize large amounts of multidimensional data on an output by rearranging data objects to variably grant more output space to areas with high data density and less output space to areas with low data density, and to variably rearrange overlapping data objects based on a number of data objects already placed at a preferred cell position for the data object.

20 Claims, 16 Drawing Sheets
(14 of 16 Drawing Sheet(s) Filed in Color)

(56) References Cited

U.S. PATENT DOCUMENTS

2009/0105984 A1   4/2009   Wen et al.

FOREIGN PATENT DOCUMENTS

| WO | 0154045 | A2 | 7/2001 |
|---|---|---|---|
| WO | 0185914 | A2 | 11/2001 |
| WO | 2006060773 | A2 | 6/2006 |
| WO | 2006110485 | A2 | 10/2006 |

OTHER PUBLICATIONS

Keim, D.A.; Panse, C.; Sips, M.; North SC; , "PixelMaps: a new visual data mining approach for analyzing large spatial data sets," Data Mining, 2003. ICDM 2003. Third IEEE International Conference on , vol., no., pp. 565-568, Nov. 19-22, 2003.*

D.A. Keim, C. Panse, M. Sips, and S.C. North, "Visual Data Mining in Large Geospatial Point Sets," IEEE Computer Graphics and Applications, vol. 24, No. 5, pp. 36-44, 2004.*

Thorsten Buering, Jens Gerken, and Harald Reiterer. 2006. User Interaction with Scatterplots on Small Screens—A Comparative Evaluation of Geometric-Semantic Zoom and Fisheye Distortion. IEEE Transactions on Visualization and Computer Graphics 12, 5 (Sep. 2006), 829-836.*

Nidal Alkharouf, "Data Mining Final Project: Analysis of Three Data Sets, Auto79, Bodyfat, Places", INFT/CSI 979, George Mason University, Sep. 30, 2009, 14 pages.

Miguel Branco et al., "Managing Very Large Distributed Data Sets on a Data Grid", Concurrency and Computation: Practice and Experience, Aug. 21, 2009, John Wiley & Sons, Ltd., 2 pages.

Jack Bresenham, "A Linear Algorithm for Incremental Display of Circular Arcs", Communications of the ACM, vol. 20, No. 2, Feb. 1977, p. 100-106.

Thorsten Büring et al., "User Interaction With Scatterplots on Small Screens—A Comparative Evaluation of Geometric-Semantic Zoom and Fisheye Distortion", IEEE Transactions on Visualization and Computer Graphics, vol. 12, No. 5, Sep./Oct. 2006, p. 829-836.

Geoffrey Ellis et al., "A Taxonomy of Clutter Reduction for Information Visualization", IEEE Transactions on Visualization and Computer Graphics, Nov./Dec. 2007, vol. 13, No. 6, p. 1216-1223.

Daniel A. Keim et al., "HistoScale: An Efficient Approach for Computing Psuedo-Cartograms", Proceedings of the 14th IEEE Visualization Conference (VIS'03) 2003, 9 pages.

John T. Langton et al., "Visualization and Interactive Exploration of Large Multidimensional Data Sets", Applications of Computational Intelligence in Biology, vol. 122, 2008, Springer Berlin, Heidelberg, Germany, p. 231-255.

Tobias Schreck et al., "Butterfly Plots for Visual Analysis of Large Point Cloud Data", 16th International Conference in Central Europe on Computer Graphics, Visualization and Computer Vision (WSCG 2008), 8 pages.

Stefan Schroedl, "Binned Scatter Plot", MATLAB Central, Apr. 8, 2008 (updated Jan. 12, 2010), www.mathworks.com/matlabcentral/fileexchange/19506.

Zhen Wen et al., "An Optimization-Based Approach to Dynamic Data Transformation for Smart Visualization", Proceedings of the 13th International Conference on Intelligent User Interfaces, Jan. 2008, p. 70-79.

Daniel A. Keim, "Datenanalyse Und Visualisierung", Universität Konstanz, Oct. 26, 2009, www.informatik.uni-konstanz.de/arbeitsgruppen/infovis/aktuelle-forschungsprojekte/geographic-data-analysis, 3 pages.

Daniel A. Keim et al., "Generalized Scatter Plots", Information Visualization, Dec. 24, 2009, Macmillan Publishers Ltd., p. 1-11.

* cited by examiner

GENERALIZED SCATTER PLOTS

BACKGROUND

Scatter Plots are one of the most powerful and most widely used techniques for visual data exploration. As the number of data points increases, scatter plots often have a high degree of overlap, which may occlude a significant portion of the data values shown. The present generalized scatter plot technique allows an overlap-free representation of large datasets to fit entirely into a single display.

The basic idea is to allow a user to optimize both a degree of overlap and a degree of distortion to generate a best possible view. In some embodiments, user inputs allow a user to zoom smoothly between a traditional scatter plot and a generalized scatter plot. Optimization functions may take overlap and distortion of the visualization into account. The present generalized scatter plots may be applied to a number of real-world applications, such as server performance monitoring, telephone service usage analysis, and financial data.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Systems, methods and computer-readable storage media are provided for a new color cell-based data placement method to visualize large amounts of data on an output. In some embodiments, the data is displayed to fit entirely into a single scatter plot display window without having overlapping data points. On-screen sliders provide a smooth interpolation mechanism to allow analysts to optimize the degree of distortion and overlap to generate different views to visualize data distribution, correlations, patterns, and outliers. Size, shape, and color may be used to allow additional parameters to be shown.

Figure 1:
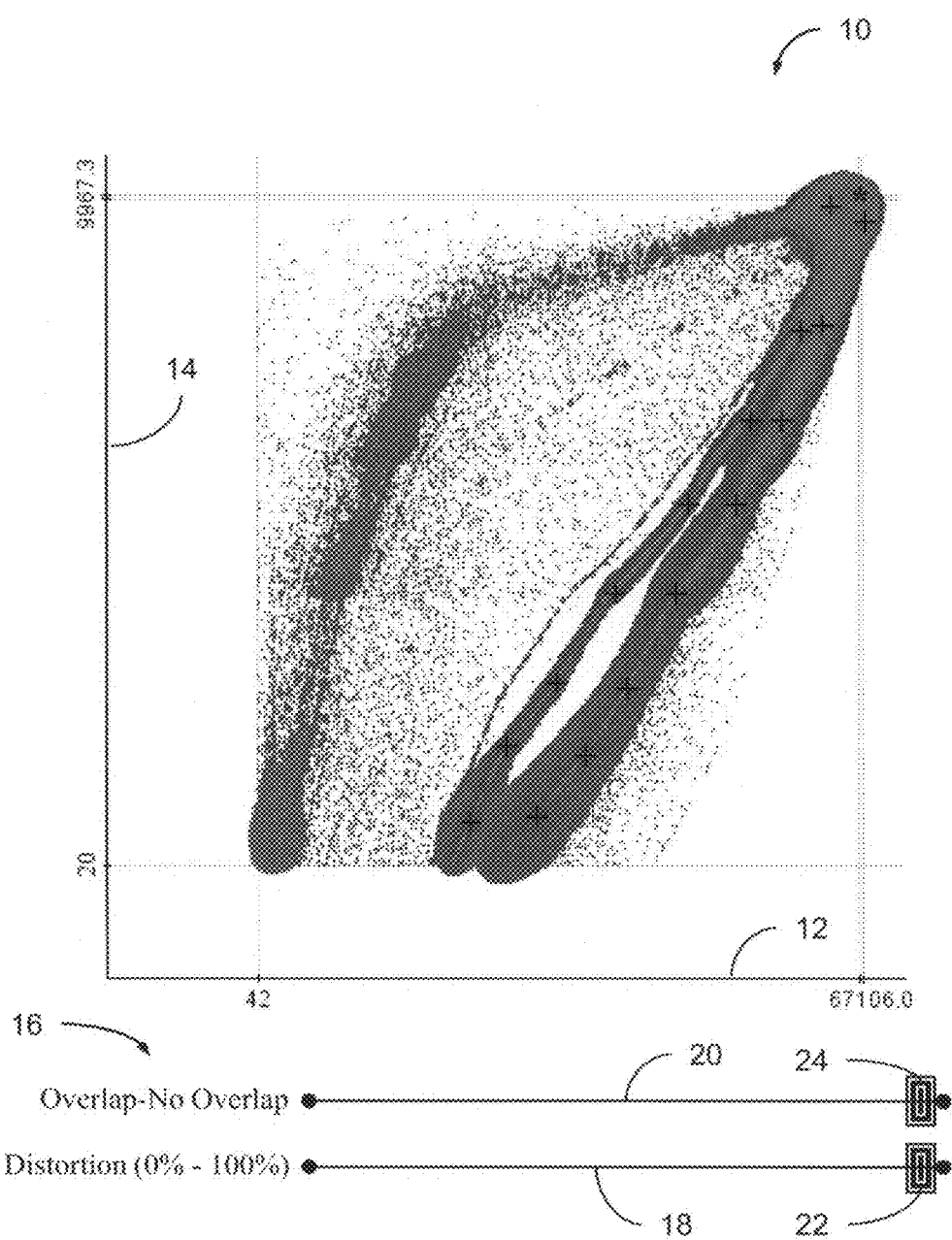
FIGS. 1-12 demonstrate generalized scatter plots with a variable degree of distortion and a variable degree of overlap, according to embodiments of the invention, as discussed in detail below. Each of FIGS. 1-12 presents a dataset of multidimensional data that includes an x-dimension that represents a call duration for telephone service, a y-dimension that represents a monetary charge for each call, and a color dimension that represents a number of participants in each call.

FIG. 1 shows a generalized scatter plot 10 of a dataset with over thirty thousand data points, after applying maximum distortion according to the present methods, and after circular displacement of those data points that would have overlapped if plotted at a calculated distorted location. Generalized scatter plot 10 may be visualized on an output such as a computer display screen or a computer printer. A horizontal X-axis is identified at 12, and a vertical Y-axis is identified at 14, and data objects are placed at a point corresponding to the X-axis according to a first dimension of the data object and at a point corresponding to the Y-axis according to a second dimension of the data object. On-screen sliders 16 are represented on the output in some embodiments, and may be controlled by user-input, optionally as clickable and dragable icons controlled by a mouse or other pointer device, as is well known for computer software with sliders. A distortion slider 18 is shown set to calculate maximum distortion, and an overlap slider 20 is shown set to calculate minimum overlap. In some embodiments, operation of a distortion optimizer, discussed in detail below, is represented on the output by visual slider 18 with a user-movable icon 22 that provides a smooth interpolation mechanism for distorting a display location of the data object. In addition or alternatively, operation of an overlap optimizer, discussed in detail below, is represented on the output by visual slider 20 with a user-movable icon 24 that provides a smooth interpolation mechanism for displacing a display location of the data object to avoid overlapping data objects.

Figure 2:
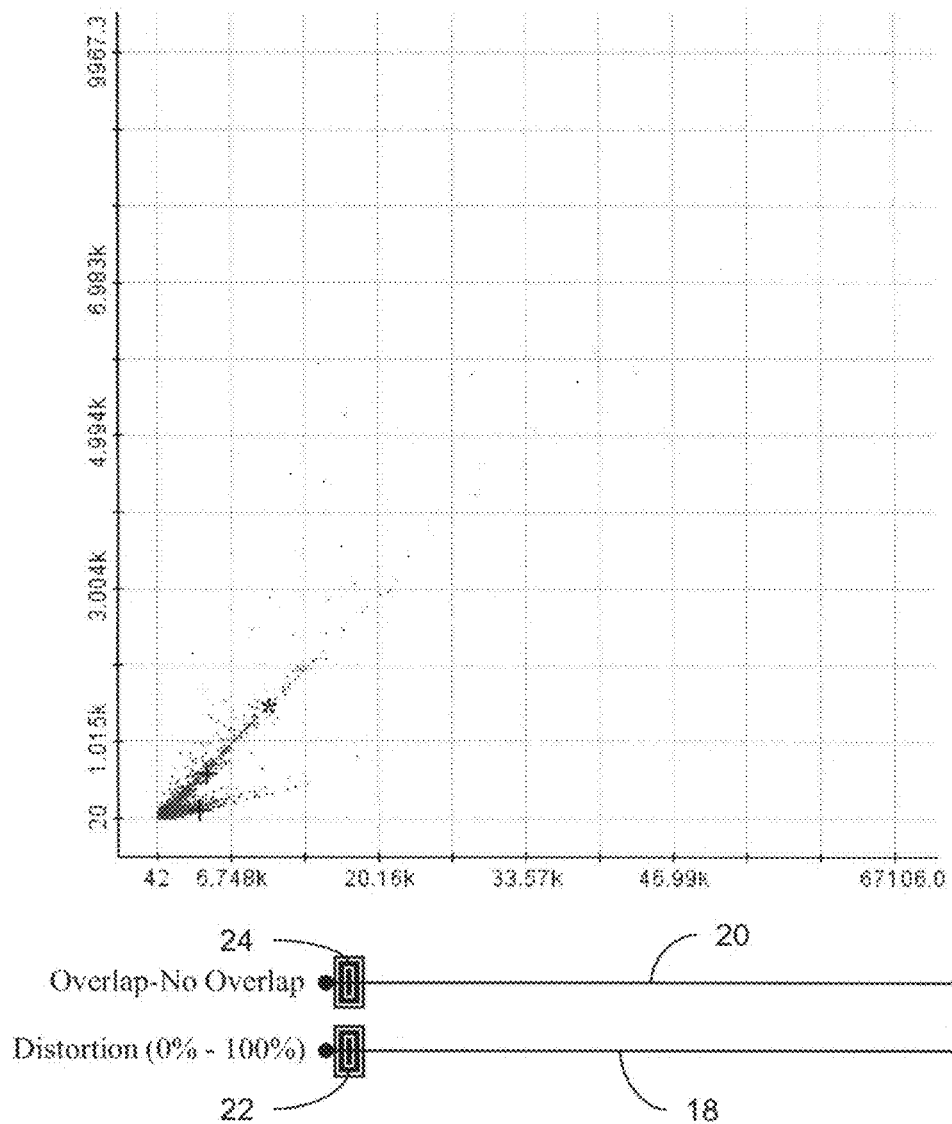

FIG. 2 shows a scatter plot of the same dataset without applying any distortion, and allowing a high degree of overlap among the data points. The data points in FIG. 2 are simply plotted at an original location dictated by traditional x-y placement of a first and second dimension of the data points. Distortion slider 18 is shown set to calculate no distortion, and overlap slider 20 is shown set to allow maximum overlap.

The data plotted in FIGS. 1 and 2 is multidimensional data that includes an x-dimension that represents a call duration for telephone service, and a y-dimension that represents a monetary charge for each call. A third dimension, representing a number of participants in each call, is mapped by applying a color to each data point, such as green for calls with only a few participants, blue for calls with more participants, and purple for calls with numerous participants. The third dimension could also be represented by size or shape, as mentioned above, but each data point will require more space on the scatter plot display window to properly show a point in a larger size, or with a human-perceptible difference in shape.

Overlap optimization, discussed in detail below, may be implemented by a circular displacement around the original x-y location, applied with a given ordering of the displacement. The original location would be a preferred cell position for each data object, if this does not result in overlap of data objects. In some embodiments, the ordering of displacement corresponds to a third attribute, such as the number of participants in a call, so that the overlap optimizer processes data objects prioritized by a third dimension. In some embodiments, overlap optimization may be implemented with other geometric displacements, such as rectangular displacement, or triangular displacement.

The default ordering starts by displacing those data points with the quantity of the third dimension that occurs least frequently in the data set, which in the dataset of FIG. 1 corresponds to telephone calls with numerous participants, shown in purple. However, user-specified priority may be allowed in some embodiments. For example, a user may specify a priority order of "start with purple, then blue, then green." The algorithms in such embodiments calculate a displaced location as near as possible to the original x-y location. Points with higher importance to a user, as optionally specified by color value of a third dimension, will be placed first and therefore be nearer to the original x-y location. Still other embodiments may use value-determined priority, in which the numeric value is used to determine a priority order, either of low-to-high, or high-to-low. For example, in the dataset of FIG. 1, the priority could start with those data points having the highest value of the third dimension, which again corresponds to telephone calls with numerous participants, shown in purple.

A counter may be included that counts the quantities of data objects grouped by values of the third dimension, and the overlap optimizer processes data objects as prioritized by a count from the counter. The counter in some embodiments ensures that data points with similar third dimensions are grouped together, either by ascending order or descending order of the value of the third dimension. For example, the counter may count data objects with different values of the third dimension, and the overlap optimizer may process data objects by starting with those data objects with a quantity of the third dimension that occurs least frequently in the data. In some embodiments, circular displacement starts with a radius of one, and increments the radius only as needed to calculate an available location for displacement.

Next, the default ordering displaces those data points with the quantity of the third dimension that occurs next least frequently in the dataset, which in the dataset of FIGS. 1 and 2, corresponds to telephone calls with more participants, shown in blue. Finally, the default ordering displaces those data points with the quantity of the third dimension that occurs most frequently in the dataset, which in the dataset of FIGS. 1 and 2, corresponds to telephone calls with few participants, shown in green. The default ordering may have numerous steps, progressing based on increasing relative quantities of data objects with each value of the third dimension, as needed.

In some embodiments, the generalized scatter plots are implemented with a variable degree of distortion and a variable degree of overlap. Each data point is presented as one color pixel or small color icon on the scatter plot display window, with the discrete units presented on the display window more generally referred to as cells. In the distorted and/or overlap-optimized generalized scatter plots, data values are placed as close as possible to their original positions.

Figure 3:
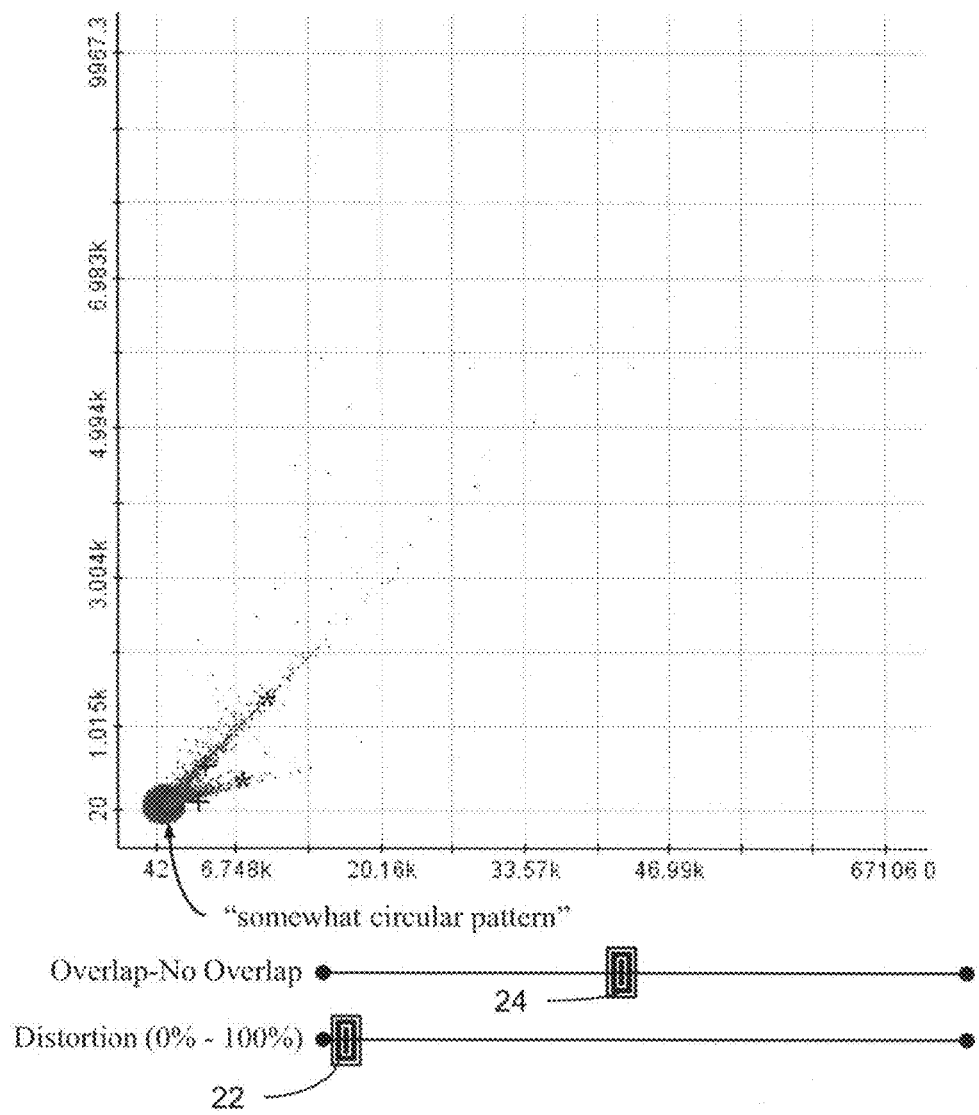
Figure 4:
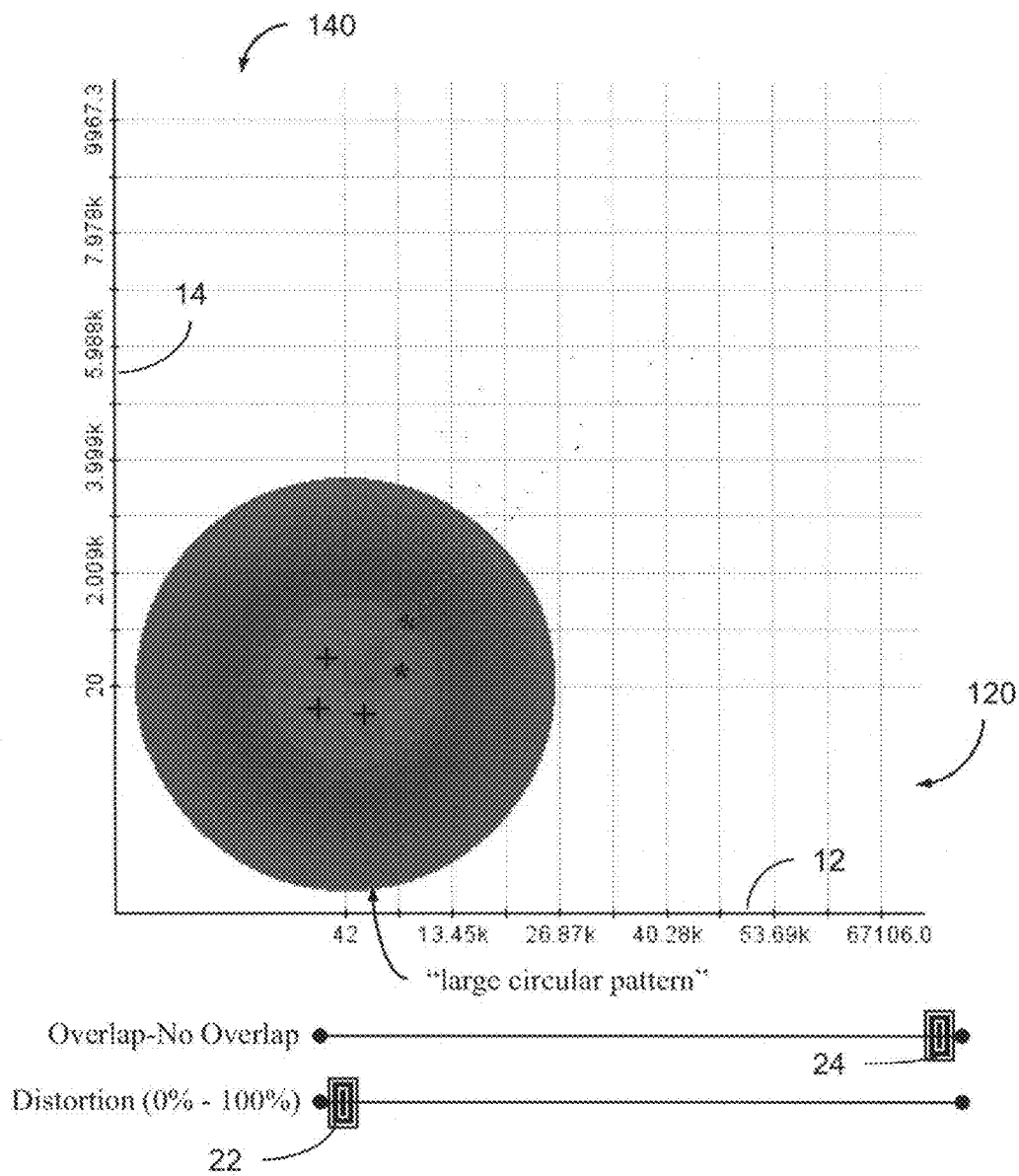

FIGS. 2-4 demonstrate stepwise reduction of overlap according to the present methods, using the dataset of FIGS. 1 and 2. Comparing FIG. 2 to FIG. 3, it will be seen that overlapping data points in FIG. 3 have been displaced relative to the original locations shown in FIG. 2. In particular, an algorithm defining an overlap optimizer that variably rearranges overlapping data objects has partially reduced the number of overlapping data objects at any given cell position based on a number of data objects already placed at a preferred cell position for the data object. Thus, the most frequent data points within a specific region are shown defining a somewhat circular pattern in the lower left hand corner of the plot in FIG. 3.

Comparing FIG. 3 to FIG. 4, it will be seen that overlapping data points in FIG. 4 have been displaced even more, relative to the displaced locations shown in FIG. 3. The algorithm defining the overlap optimizer has more completely rearranged overlapping data objects based on a number of data objects already placed at a preferred cell position for the data object. Thus, in FIG. 4, the most frequent data points within a specific region are shown defining a large circular pattern in the lower left hand corner of the plot. The high density of data points in the region defined by x=42 and y=20 results in the substantially circular displacement generally centered in this region.

Extra space has been granted to the lower portion and far left of the plot, as indicated in FIG. 4 at 120 and 140, adjacent X-axis 12 and Y-axis 14, respectively. The extra space is calculated by an algorithm that linearly compresses the remaining portion of the plot, corresponding to X-axis values 42 through 67106.0, and Y-axis values 20 through 9967.3.

Distortion, also discussed in detail below, is implemented based on a linear distortion in x and y direction which ensures an equal distribution of the data in x and y dimension. The distortion grants more space to areas with high density and less space to areas with low density, while retaining neighborhood relationships of the data points. Comparing FIG. 2 to FIG. 5, it will be seen that data points have been spread out within a high-density range of the x-axis and the y-axis, relative to the original locations shown in FIG. 2. As demonstrated by the substantially circular displacement generally centered near the region defined by x=42 and y=20, FIG. 4, the highest density of data points is within the x-axis range of 42 through 6.784 k, and within the y-axis range of 20 through 1.015 k.

In particular, a distortion optimizer that variably grants more output space to areas with high data density and less output space to areas with low data density has partially rearranged high-density data objects based on an interpolation discussed in detail, below. More space has been granted to the data points within the x-axis range of 42 through 6.784 k, and within the y-axis range of 20 through 1.015 k. This space is granted by an algorithm that linearly compresses the remaining portion of the plot, corresponding to X-axis values 6.784 k through 67106.0, and Y-axis values 1.015 k through 9967.3.

Figure 5:
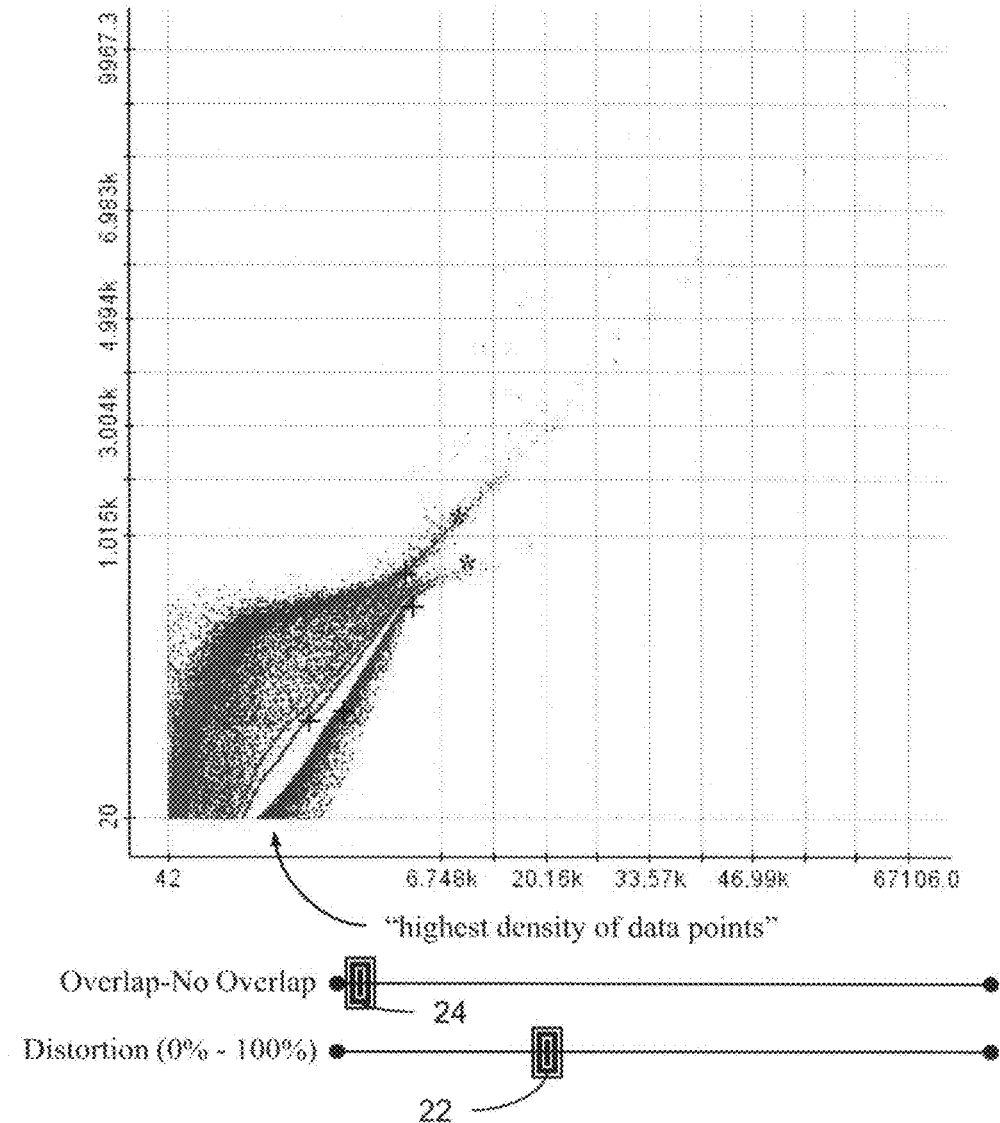
Figure 6:
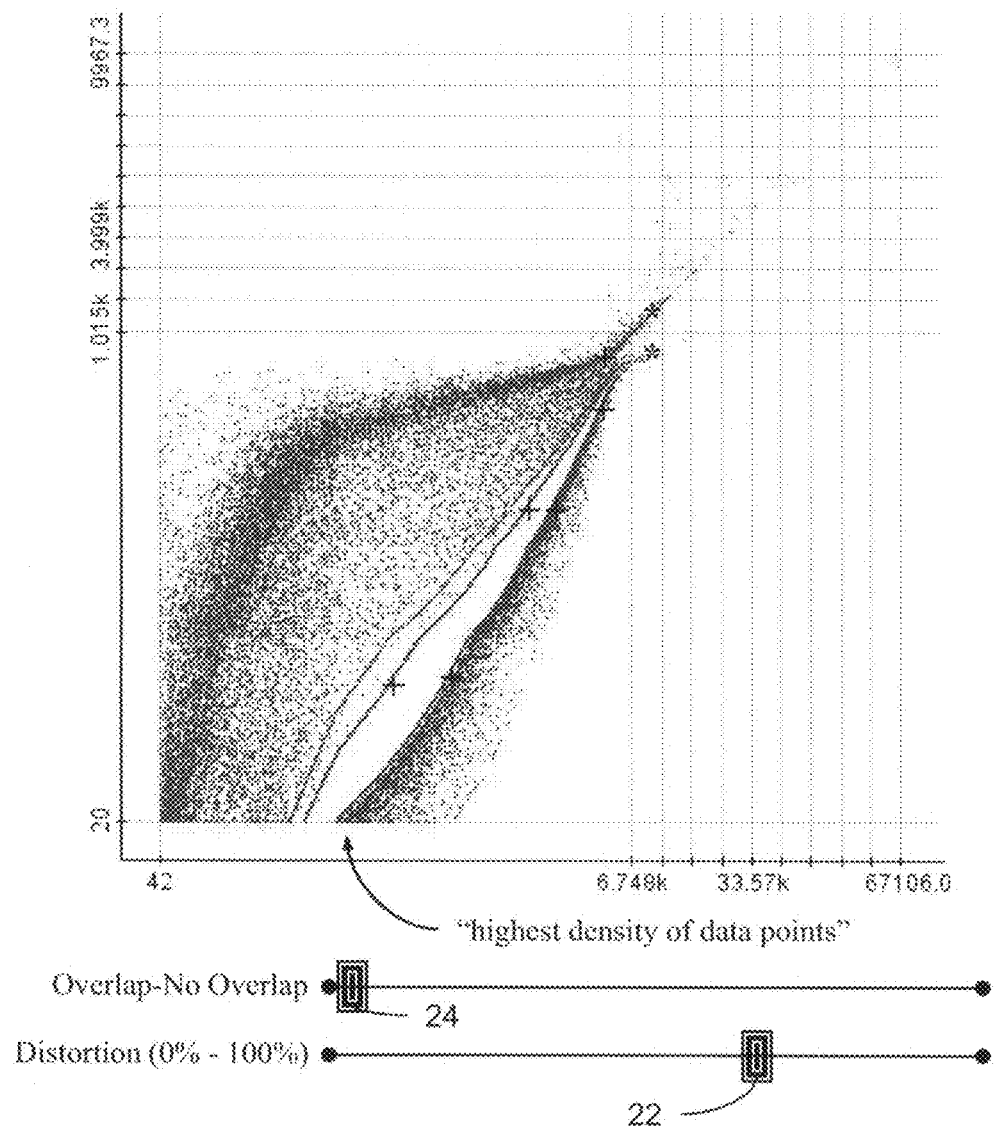

Comparing FIG. 5 to FIG. 6, it will be seen that the distortion optimizer has granted more output space in FIG. 6 to areas with high data density and less output space to areas with low data density, by further rearranging high-density data objects within the x-axis range of 42 through 6.784 k, and within the y-axis range of 20 through 1.015 k. This granting of more output space is allowed by additional linear compression of the remaining portion of the plot, corresponding to X-axis values 6.784 k through 67106.0, and Y-axis values 1.015 k through 9967.3. Comparing FIG. 6 to FIG. 7, it will be seen that the distortion optimizer has granted a majority of the output space in FIG. 7 to the area with high data density, namely within the x-axis range of 42 through 6.784 k, and within the y-axis range of 20 through 1.015 k. A major linear compression of the remaining portion of the plot, corresponding to X-axis values 6.784 k through 67106.0, and Y-axis values 1.015 k through 9967.3, results in the remaining portion becoming visually insignificant in the generalized scatter plot shown in FIG. 6.

Figure 7:
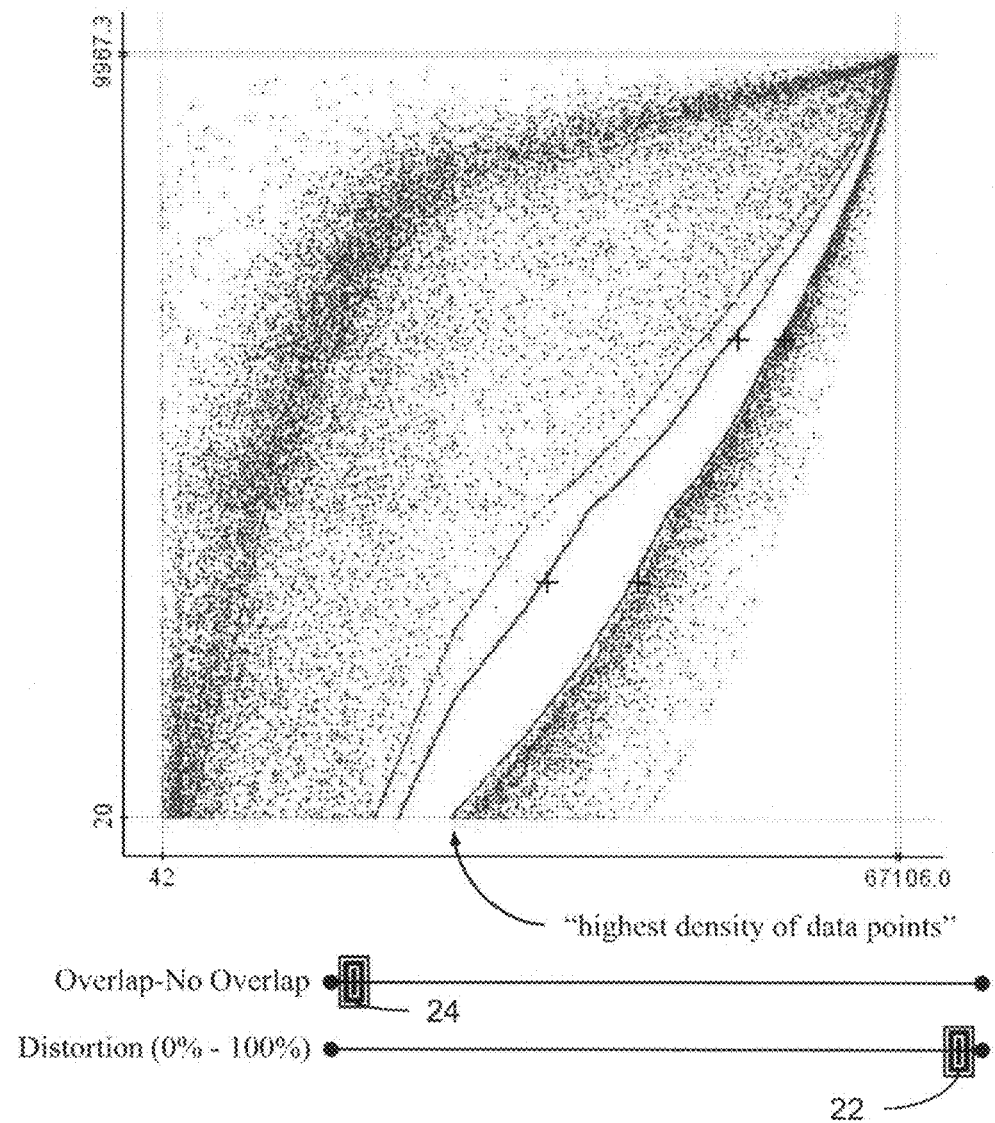
Figure 8:
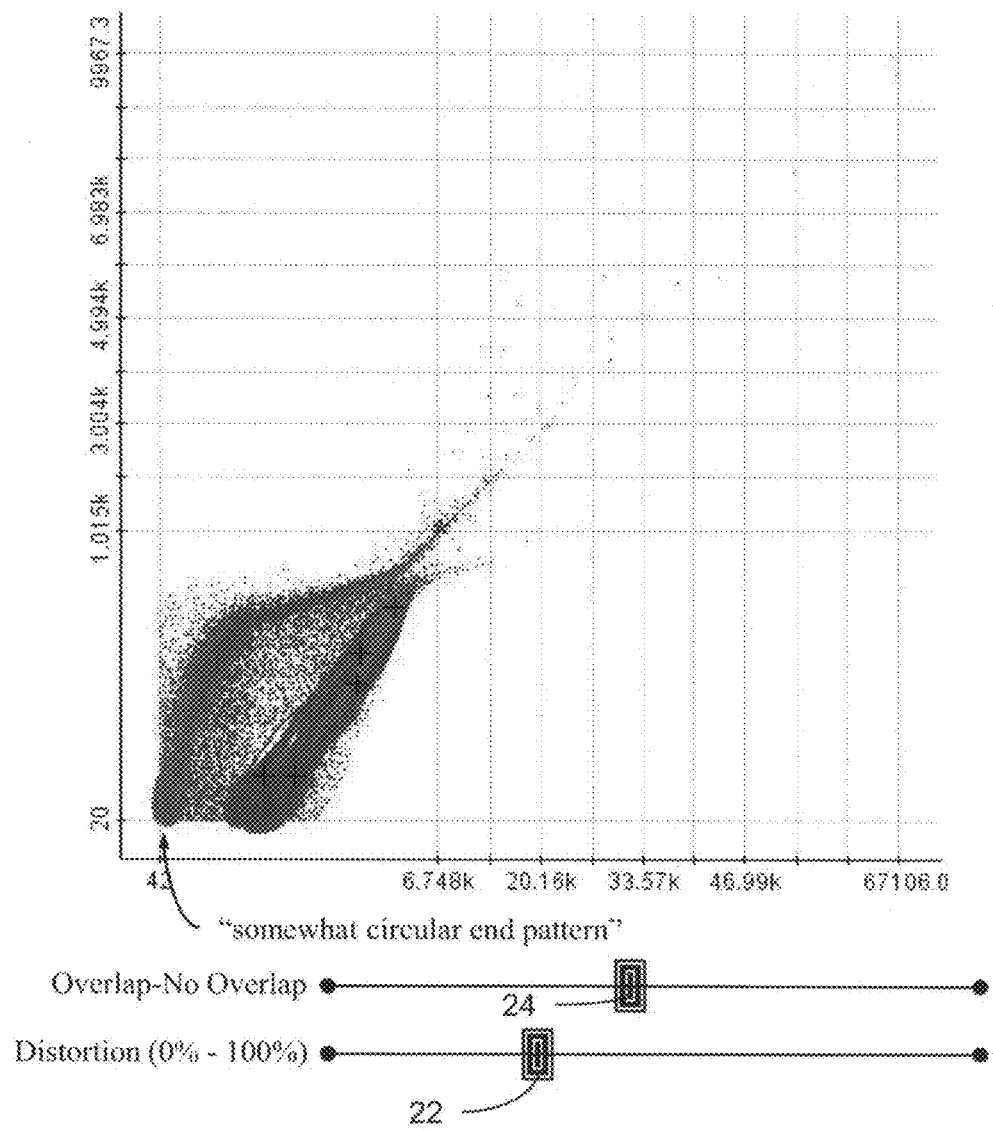
Figure 9:
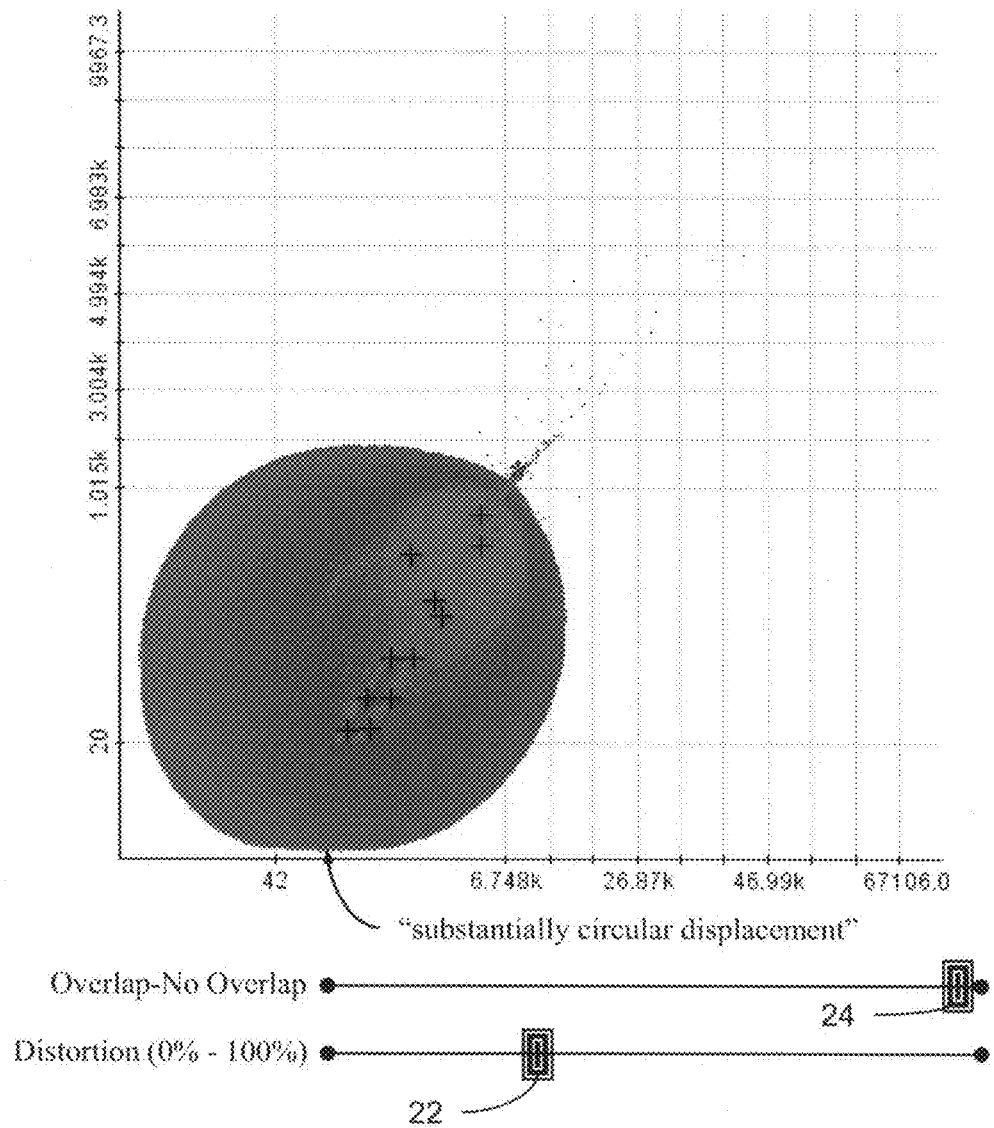

FIGS. 5, 8 and 9 collectively demonstrate stepwise reduction of overlap according to the present methods, similar to that collectively demonstrated by FIGS. 2-4, but with partial distortion applied by the distortion optimizer. Comparing FIG. 5 to FIG. 8, it will be seen that overlapping data points in FIG. 8 have been displaced relative to the original locations shown in FIG. 5. In particular, an algorithm defining an overlap optimizer has partially rearranged overlapping data objects based on a number of data objects already placed at a preferred cell position for the data object. Thus, the most frequent data points within a specific region are shown defining a somewhat circular end pattern in the lower left hand corner of the plot in FIG. 8.

Comparing FIG. 8 to FIG. 9, it will be seen that overlapping data points in FIG. 9 have been displaced even more, relative to the displaced locations shown in FIG. 8. The algorithm defining the overlap optimizer has more completely rearranged overlapping data objects based on a number of data objects already placed at a preferred cell position for the data object. Thus, in FIG. 4, the most frequent data points within a specific region are shown defining a large circular pattern in the lower left hand corner of the plot. The high density of data points in the region defined by x=42 and y=20 results in the substantially circular displacement generally centered in this region, while the distortion spreads out the data points more than is seen in FIG. 4.

Figure 10:
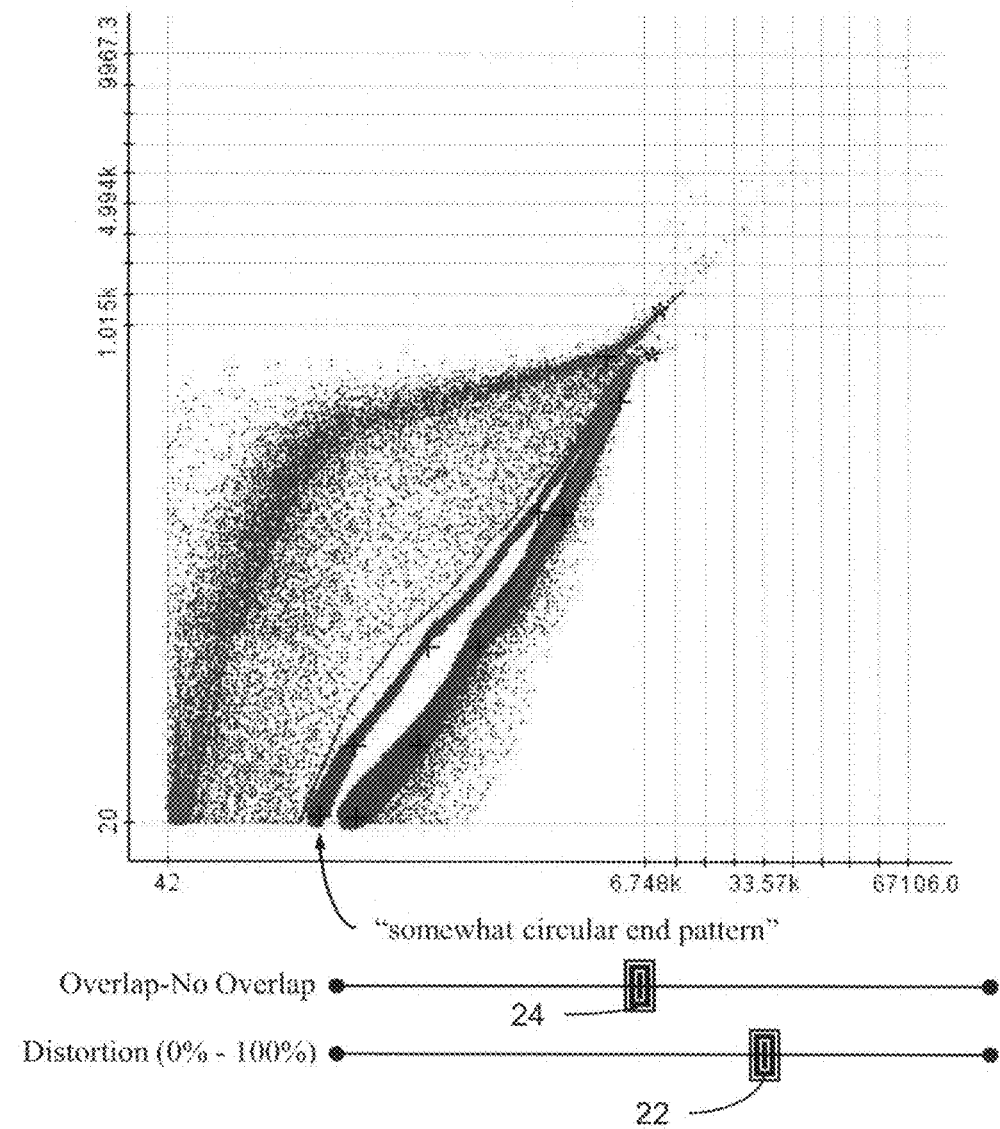
Figure 11:
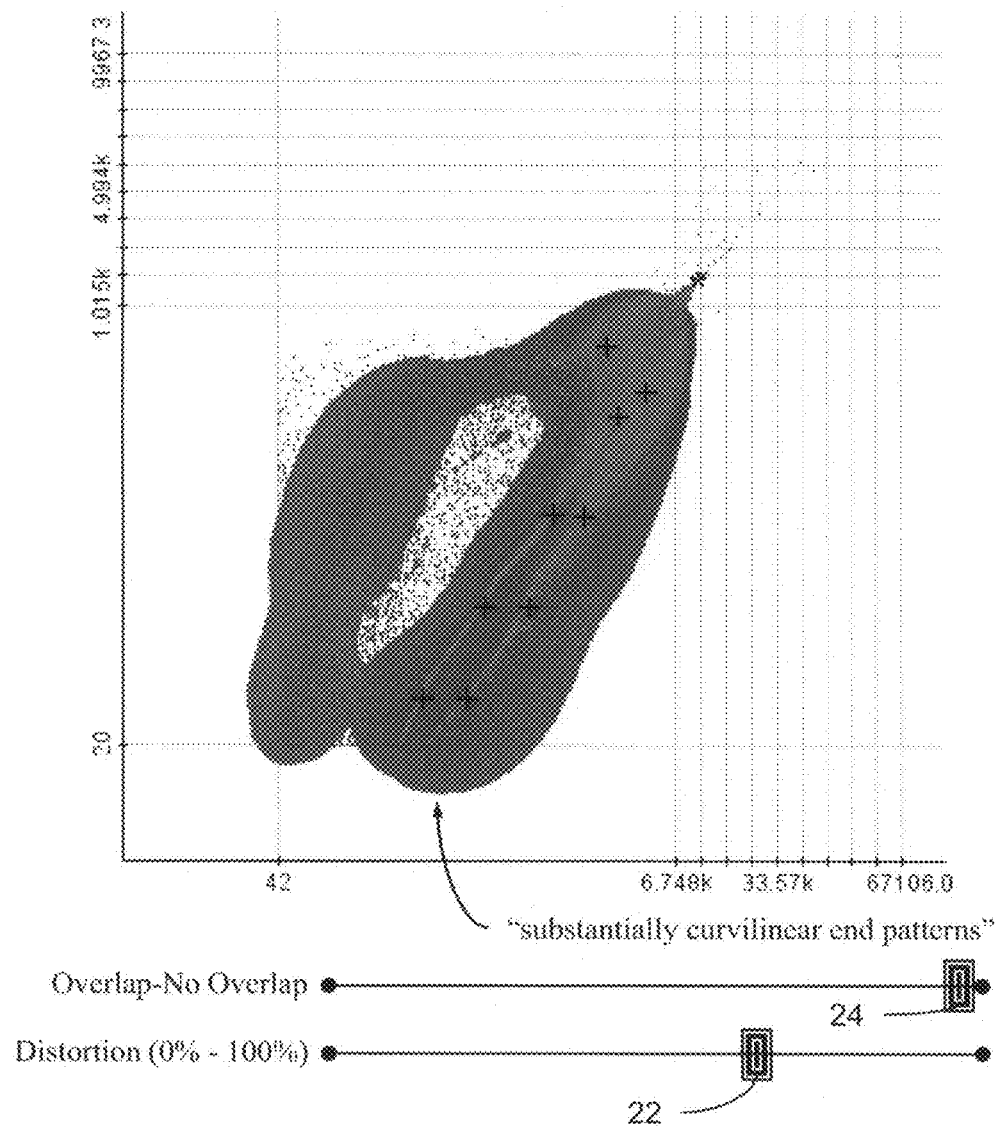

FIGS. 6, 10 and 11 collectively demonstrate stepwise reduction of overlap according to the present methods, similar to that collectively demonstrated by FIGS. 2-4 and FIGS. 5, 8 and 9, but with substantial distortion applied by the distortion optimizer. Comparing FIG. 6 to FIG. 10, it will be seen that overlapping data points in FIG. 10 have been displaced relative to the original locations shown in FIG. 6. In particular, an algorithm defining an overlap optimizer has partially rearranged overlapping data objects based on a number of data objects already placed at a preferred cell position for the data object. The substantial distortion of the distortion optimizer has provided sufficient space in high density areas to decrease the necessity of data object displacements. The data points within the most dense portions of a specific region are shown defining somewhat curvilinear end patterns to a visible line of data points, particularly in the lower left hand corner of the plot in FIG. 10.

Comparing FIG. 10 to FIG. 11, it will be seen that overlapping data points in FIG. 11 have been displaced even more, relative to the displaced locations shown in FIG. 10. The algorithm defining the overlap optimizer has more completely rearranged overlapping data objects based on a number of data objects already placed at a preferred cell position for the data object. The high density of data points in the entire distorted region of FIG. 11 results in substantially curvilinear end patterns to a visible line of data points, particularly in the lower left hand corner of the plot in FIG. 11.

Figure 12:
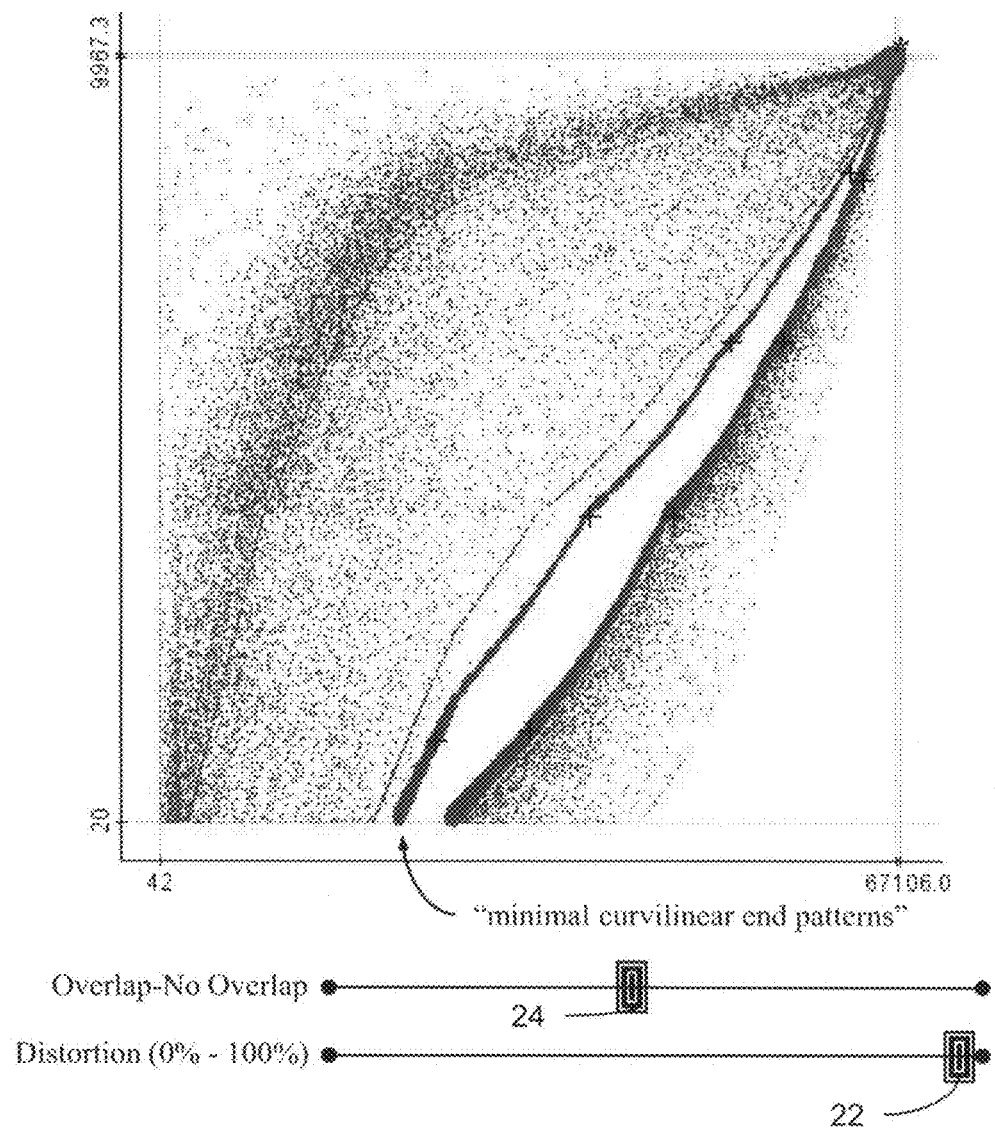

FIGS. 7, 12 and 1 collectively demonstrate stepwise reduction of overlap according to the present methods, similar to that collectively demonstrated by FIGS. 2-4, FIGS. 5, 8 and 9, and FIGS. 6, 10 and 11, but with maximum distortion applied by the distortion optimizer. Comparing FIG. 7 to FIG. 12, it will be seen that overlapping data points in FIG. 12 have been displaced relative to the original locations shown in FIG. 7. In particular, an algorithm defining an overlap optimizer has partially rearranged overlapping data objects based on a number of data objects already placed at a preferred cell position for the data object. The maximum distortion of the distortion optimizer has provided sufficient space in high density areas to substantially limit the necessity of data object displacements. The data points are distributed in a more discrete pattern, with minimal curvilinear end patterns to any visible line of data points, most notably in the lower middle of the plot in FIG. 12, and in the upper right-hand corner.

Comparing FIG. 12 to FIG. 1, it will be seen that overlapping data points in FIG. 12 have been displaced even more in FIG. 1, relative to the partially displaced locations shown in FIG. 12. The algorithm defining the overlap optimizer has more completely rearranged overlapping data objects so that only one data object is represented at any given cell. The high density of data points in a few bands of FIG. 1 results in substantially curvilinear end patterns and a visual thickening of separately visible lines of data points.

While a user may variably adjust either or both of distortion slider 18 and overlap slider 20, in either direction, and interactively, the actual transformation of the data points into visual points on the display is implemented by first applying the distortion optimizer, and then applying the displacement optimizer. The distortion optimizer may provide more space in high density areas, which decreases the necessity of data point displacements. By first applying the distortion optimizer, the effectiveness and efficiency of the method is improved because there will be fewer data points that require operation of the displacement optimizer.

The generalized scatter plots of the present disclosure are demonstrated in FIGS. 1-12 using only three steps of resolution in which the overlap optimizer variably rearranges overlapping data objects, and only four steps of resolution in which the distortion optimizer variably grants more space to certain areas. However, some implementations use a smooth interpolation of both overlap and distortion. Some methods allow the user to dynamically move sliders 18 and 20 to optimize the degree of overlap and distortion to generate the best possible view according to the user's needs. It allows a seamless path from traditional scatter plots and to generalized scatter plots.

Implementation

Figure 13:
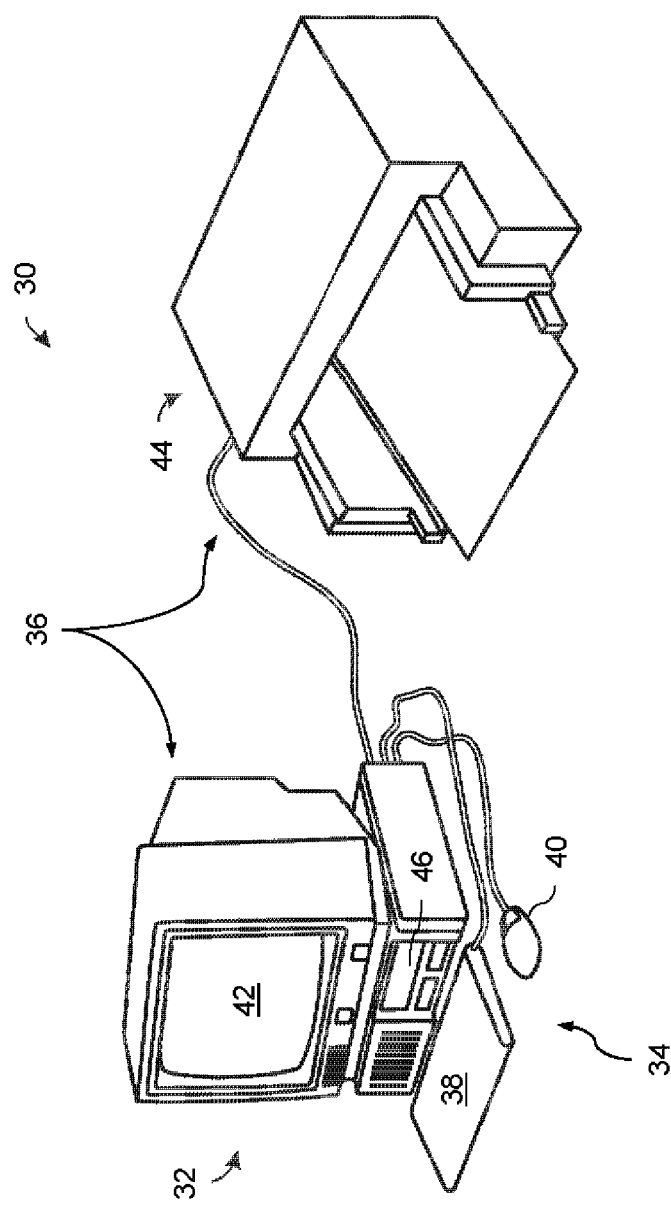
FIG. 13 depicts an example system including a computer, a keyboard, a computer mouse, a CRT display and a printer, according to an embodiment of the invention.

One example of a color cell-based data placement system is shown in FIG. 13, indicated generally at 30. System 30 includes a computer 32, user input 34, and output 36. User input 34 typically includes a keyboard 38 and a mouse 40, but numerous other input devices may be used, as is well known in the art. For example, input 34 may include but is not limited to track pads, track balls, joysticks, digitizer tablets, touch screens, microphones linked to voice-recognition algorithms, and still and video cameras linked to optical recognition and gesture recognition algorithms. Similarly, output 36 typically includes a display 42 and a printer 44, but numerous other output devices may be used including but not limited to flat-panel displays, video projectors, e-readers, and plotters.

Figure 14:
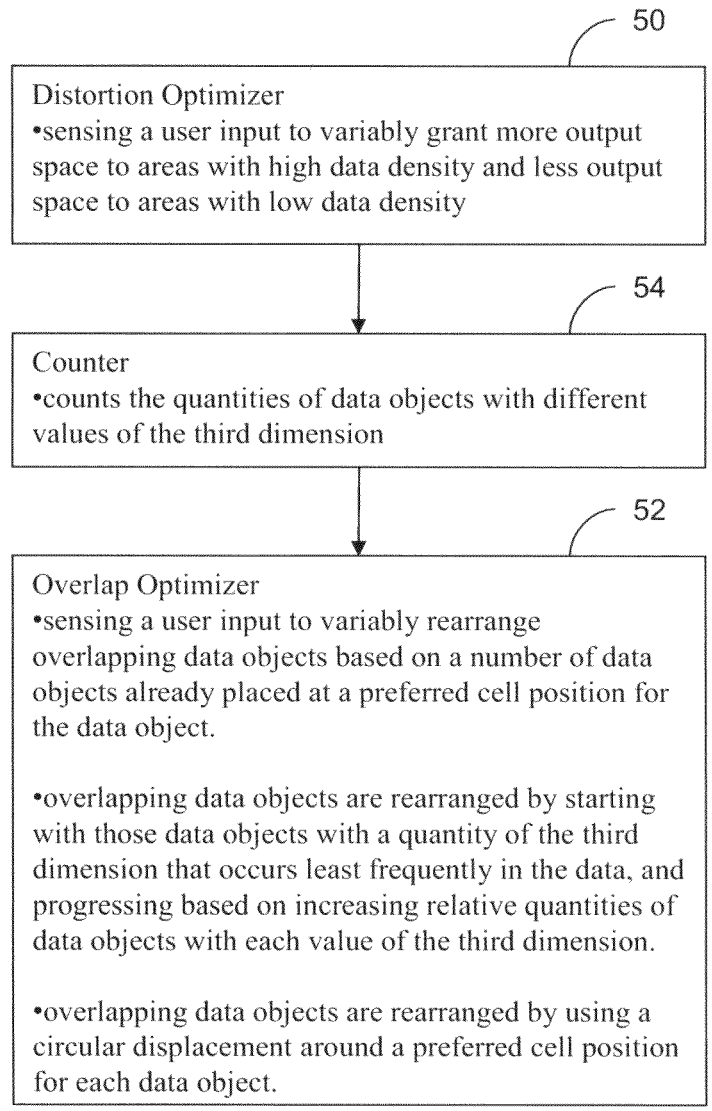
FIG. 14 depicts an example method of color cell-based data placement to visualize large amounts of data on an output, according to an embodiment of the invention.

System 30 includes computer-readable storage media 46, which may take the form of internal or external memory devices, as is known in the art. Storage media 46 may have computer-executable instructions for cell-based data placement to visualize large amounts of multidimensional data on output 36. These instructions operate inside system 30, causing computer 32 to perform various methods with various steps, as illustrated generally in FIG. 14. A distortion optimizer 50 includes algorithms that perform steps including sensing a user input to variably grant more output space to areas with high data density and less output space to areas with low data density. An overlap optimizer 52 includes algorithms that perform steps including sensing a user input to variably rearrange overlapping data objects based on a number of data objects already placed at a preferred cell position for the data object. In some embodiments, these instructions implement a counter 54 that causes computer 32 to perform a step that counts the quantities of data objects with different values of the third dimension. In some embodiments, counter 54 is used so that overlapping data objects are rearranged by starting with those data objects with a quantity of the third dimension that occurs least frequently in the data, and progressing based on increasing relative quantities of data objects with each value of the third dimension. In addition or alternatively, overlapping data objects are rearranged progressing based on increasing relative quantities of data objects with each value of the third dimension. Yet additionally or alternatively, overlapping data objects are rearranged by using a circular displacement around a preferred cell position for each data object.

The present generalized scatter plot systems, methods and computer-readable storage mediums are designed as interactive tools, and in some embodiments, the algorithms used should be as efficient as possible. One embodiment of a distortion algorithm is as follows.

```
double distortSinglePoint (double coord)
{
    double newPosition = 0.0;
    // determine the bin (following called B) containing given coordinate
    int bin = calcBinFromCoord(coord);
    // summing up all bin widths being left of given coordinate
    for (int i = 0; i < bin; i++)
        newPosition += nrOfPointsInBin[ i ] / countOfAllPoints;
    // find relative position in the containing bin B and multiply with desired width of B
    xPosBinPlot +=
    // relative position in bin B
    (coord − calcXCoordFromBin(bin)) / (calcXCoordFromBin(bin +1) − calcXCoordFromBin(bin))*
    // desired width of bin B
    (nrOfPointsInBin [ bin ] / countOfAllPoints);
    return xPosBinPlot;
}
```

The above algorithm operates on a single dimension. A second dimension can be distorted in the same way.

One embodiment of an overlap optimized pixel placement algorithm is as follows.

```
doPixelArrangement(OrderedList DataObjects)
    int[ ][ ] overlapCount := new int[width][height];
    for each o of DataObjects do
        Point p := o.getPixelPos( );
        if (overlapCount[p.x][p.y] < maxOverlap)
            o.setPaintPos(p);
            overlapCount[p.x][p.y]++;
        else
            rearrangeDataObject(o, p, overlapCount);
    end for;
```

As depicted in 'doPixelArrangement', this algorithm displaces the points in order of their priority (e.g., the value of the point) to avoid random patterns in the resulting visualization. For example, user input, not shown, may be used to assign a specific priority based on a third dimension of each point.

The algorithm remembers how many data objects are already located at a specific pixel location, using a two-dimensional integer array representing each pixel of the display area. For each data point, the program looks up the number of data objects already placed at a preferred position of the data object and compares this to a maximum allowable number of overlapping points. In some embodiments, the maximum allowable number of overlapping points depends on an interactively chosen overlap level, represented on the output by a visual slider 20. If the algorithm determines that a current data object can be placed at its preferred location, this information is stored in the two-dimensional integer arrays. Otherwise, the algorithm computationally looks for a next free pixel position in order to place the current data object, using a rearrangement algorithm as follows.

```
rearrangeDataObject(o, p, overlapCount)
    int radius := getLastUsedRadius(p);
    Point[ ] circlePoints := calcCirclePoints(p, radius);
    while new place not found do
        if any circlePoints left
            Point p := next circlePoint;
                if (overlapCount[p.x][p.y] < maxOverlap)
                    o.setPaintPos(p);
                    overlapCount[p.x][p.y]++;
        else
            radius++;
            circlePoints := calcCirclePoints(p, radius);
    end while;
    updateLastUsedRadius(p, radius);
```

The calcCirclePoints portion of the algorithm returns the pixels of a circle ordered by distance from an original pixel position. When the algorithm determines there is a choice of candidate pixels, the algorithm checks each of choice of candidate pixels until it can either place the data object or there are not any available pixels on the circle with a current radius. In the second case, the algorithm increases the radius and calculates a new pixel position using this increased radius. The algorithm stores a last-used radius to accelerate future displacement operations.

The algorithm rearrangeDataObject calculates real pixel placement. In order to have a fast algorithm for each pixel, the last used radius is stored. (The initial value is 1). The algorithm may calculate pixels of a circle around point p with this stored radius. One embodiment of the overlap optimizer algorithm calculates pixels of a circle with a line width of two. This helps avoid a calculated result in which not every pixel is touched when the radius is increased by one, which is undesirable because a significant number of pixels may not be used in a particular area, thereby creating artifacts in a resulting visualization.

Smooth Interpolation

The present systems and methods provide generalized scatter plots anywhere in between a traditional scatter plot (with no distortion and no displacement to avoid overlap) and an improved scatter plot with overlap-optimized visualization. Some embodiments of the systems and methods implement a smooth interpolation between these extremes.

The interpolations of distortion and overlap optimized visualization are calculated differently and are therefore independent of each other. For the interpolation between the distorted and non-distorted positions, a weighted average may be used. This weighted average may be adjusted interactively using sliders 18 and 20, and directly influences any resulting linear interpolation.

Optimization Goals

One optimization goal is that the displacement of points with respect to their original position should be minimal which is important in order to understand the generated scatter plots. For a given data set of n points p1, ... pn, let $O(p_i)$ denote the original location and $N(p_i)$ denote the calculated position in the generated scatter plot, and $d(O,N)$ is a distance function in the scatter plot measuring the Euclidean distance of O and N. The displacement error is calculated as follows:

$$e_{disp} = \sum_{i=1}^{n} \frac{d(O(p_i), N(p_i))}{n}$$

The displacement error measures the amount of positional changes of all data points between the original scatter plot and the generalized scatter plot.

The second optimization goal is that the overlap of points should be as minimal as possible. The overlap of points can be measured by the following function:

$$e_{overlap} = \frac{|\{p_i \mid \exists j : N(p_i) = N(p_j) \wedge i \neq j\}|}{n}$$

Note that there is a trade-off between the two functions: An increase in distortion usually results in a lower overlap error, but also results in a higher displacement error. To calculate a combined optimization function, a weighted sum of the error functions may be used, with c being a proportionality constant:

$$c * e_{dist} + (1-c) * e_{overlap} \rightarrow \text{MIN}$$

Example Applications

To best understand methods described herein, it is helpful to discuss examples. Real world datasets can best show the contribution of the proposed overlap-optimized scatter plot technique.

In the dataset shown in FIGS. 1-12, 37788 entries are shown, related to Telephone Conference Calls.

A Telephone Service Usage Analysis

Telephone service usage analyses include the following tasks:
  exploring the distribution of the call amounts
  determining the call duration time and the most common charges and
  investigating the correlation of the conference call charge with the length of the call and with the number of participants Overlap-optimized Scatter Plots can help in revealing the answers to these questions. Overlap-optimized scatter plots have the advantage that they are more similar to traditional scatter plots—in the case of no distortion and data-induced full overlap they are identical to traditional scatter plots. There is no need to use artificial binning which also helps to retain a more traditional view of the data and especially displays neighborhood relationships better.

The highly clustered data of FIG. 2 is partitioned and more details about the data become visible as one applies increasing distortion and decreasing overlapping, as demonstrated in different combinations in FIGS. 1 and 3-12. For example, at least two curves are visible for maximum overlap and medium distortion level in FIG. 5, which split into at least four separate curves by maximum overlap and maximum distortion level in FIG. 7. Finally, minimum overlap and maximum distortion as shown in FIG. 1 clearly shows interesting details that are not visible in the traditional scatter plot of FIG. 2. In FIG. 1, up to nine different curves can be discerned, each corresponding to a particular rate.

In addition, analysts are able to learn additional facts from the data, demonstrating the additional value of generalized scatter plots. The following correlations between the charges, duration, and the number of participants can be observed in FIG. 1:

1. The left curve illustrates that the most expensive calls have high volumes (many data points) and correlate with the time and number of participants. However, there is a wide distribution in charges. Interestingly, the most expensive calls are the national calls.

2. Then, there is a middle curve which is significantly less expensive but also shows a clear correlation between charge and seconds. This curve is due to a special rate to Canada, which can only be used for a small number of participants (only green points).

3. The right section contains the international calls. There are three blue curves representing three different service providers. The rightmost curve has the highest number of calls, which with a high degree of overlap could not be shown in FIG. 2.

4. The thickness of the curves reveals the number of national and international calls. From the comparison of the thickness of the curves we learn that the international calls have a clear charge structure for each provider (solid lines) while the charges of national calls are more variable and depend on other parameters not shown in the visualization (e.g. time of the day).

System and Application Performance Visual Analytics

Figure 15:
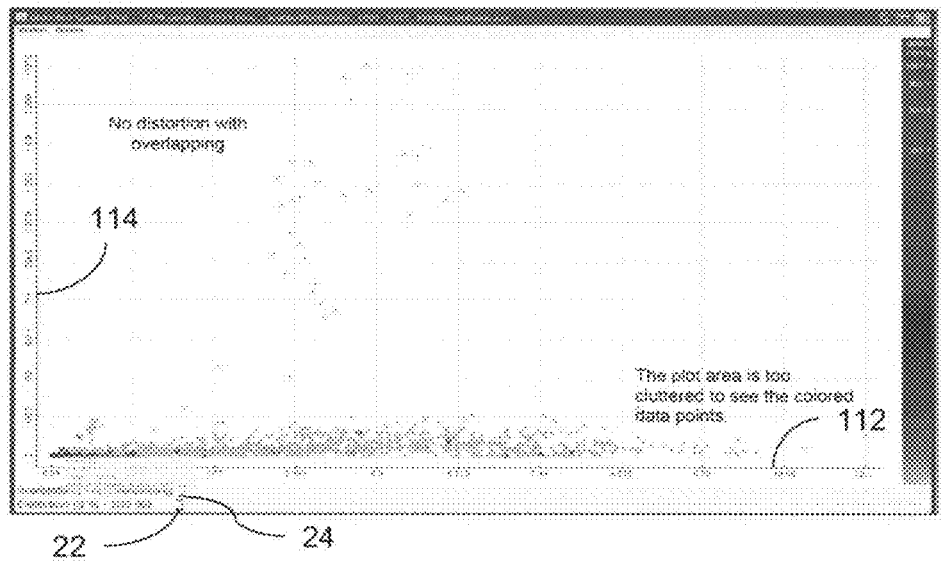
FIGS. 15-17 demonstrate generalized scatter plots, according to embodiments of the invention, using a dataset of multidimensional data that includes an x-dimension representing I/O usage of a computer system, a y-dimension that represents CPU usage, and a color-dimension that represents the number of data points which have the same (xi, yi) position. Note that in FIGS. 15-17, the word "overplotting" is used as an alternative to "overlap."
Figure 16:
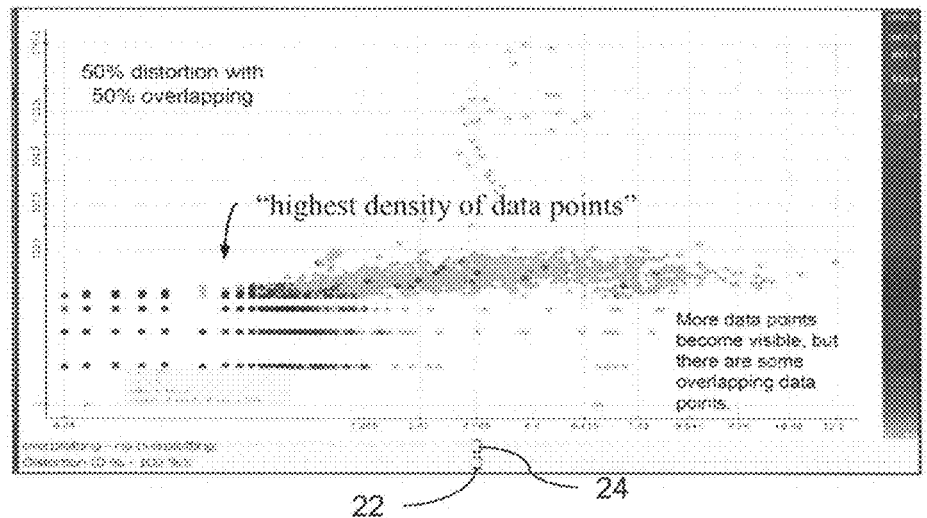
Figure 17:
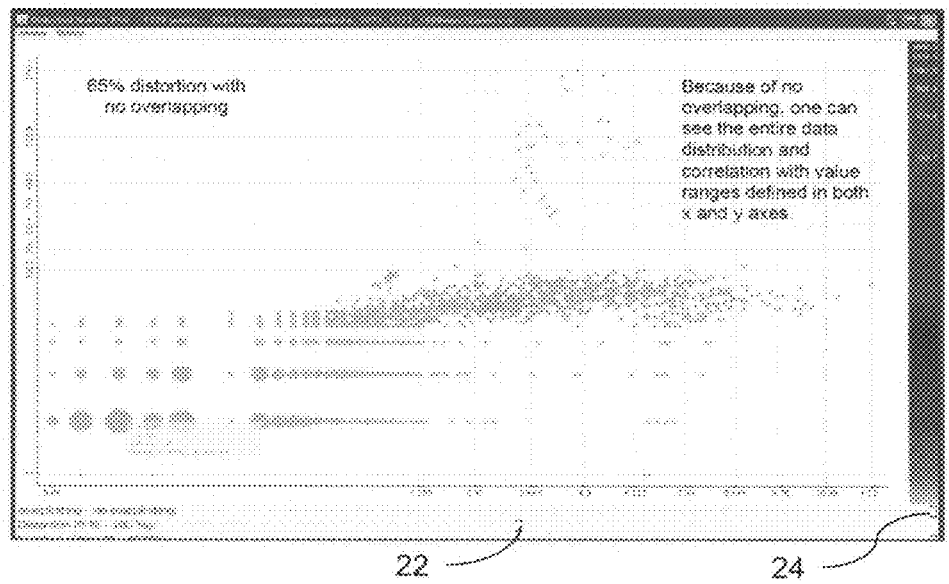

FIGS. 15-17 demonstrate operation of an embodiment of this disclosure, showing scatter plots of a dataset measuring central processing unit (CPU) and input/output (I/O) usage distribution and relationships, after binning has been applied, as is known in the art. The x-axis 112 represents I/O usage. The y-axis 114 represents CPU usage. The color represents the number of data points which have the same (xi, yi) position. Note that in FIGS. 15-17, the word "over-plotting" is used as an alternative to "overlap."

The scatter plot in FIG. 15 shows the binned data plotted at an original location dictated by traditional x-y placement of a first and second dimension of the data points. Distortion slider 18 is shown set to calculate no distortion, and overlap slider 20 is shown set to allow maximum overlap. The plot area is too cluttered to see many of the colored data points, potentially resulting in a misleading data representation.

In FIG. 16, distortion slider 18 is shown set to calculate approximately 50% distortion, and overlap slider 20 is shown set to allow approximately 50% overlap. Comparing FIG. 16 to FIG. 15, more data points become visible in FIG. 16 than are visible in FIG. 15, but the data points in FIG. 16 are still not large enough to see many of the overlapping data points.

In FIG. 17, distortion slider 18 is shown set to calculate approximately 65% distortion, and overlap slider 20 is shown set to allow minimum overlap (100% non-overlapping points). Comparing FIG. 17 to FIGS. 15 and 16, overlapping data points from FIGS. 15 and 16 are plotted into corresponding circular areas in FIG. 17. These circular areas are scaled to allow each data point to be shown without any overlap, while the relative position of a data point is retained as accurately as possible.

The disclosure set forth above may encompass multiple distinct embodiments with independent utility. The specific embodiments disclosed and illustrated herein are not to be considered in a limiting sense, because numerous variations are possible. The subject matter of this disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether directed to a different embodiment or to the same embodiment, and whether broader, narrower, equal, or different in scope to the original claims, also are regarded as included within the subject matter of the present disclosure.

Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

We claim:

1. A cell-based data placement system to visualize large amounts of multidimensional data on an output, comprising:
   (a) a distortion optimizer implemented at least in hardware including a processor, that varies distortion by granting more output space to areas with high data density and less output space to areas with low data density, wherein the varied distortion is controllable via a distortion slider to a setting between a no distortion setting and a maximum distortion setting, and
   (b) an overlap optimizer implemented at least in the hardware, that varies overlap of data objects based on a number of data objects already placed at a preferred cell position for the data object, wherein the varied overlap is controllable via an overlap slider to a setting between a no overlap setting and a full overlap setting, and wherein the output is determined by minimizing a weighted average of a displacement error determined by the distortion optimizer and an overlap error determined by the overlap optimizer.

2. The system of claim 1, wherein the overlap optimizer is implemented using a geometric displacement around a preferred cell position for each data object.

3. The system of claim 2, wherein the overlap optimizer calculates cells of a circle with a line width of two cells.

4. The system of claim 1, wherein:
   the data objects are placed according to a first dimension and a second dimension,
   the overlap optimizer processes the data objects prioritized by a third dimension, and
   each data object has a numeric value in the third dimension, and the overlap optimizer processes the data objects in a prioritized manner based on the numeric values of the data objects, such that the data objects having lower numeric values in the third dimension are processed before the data objects having higher numeric values in the third dimension, or such that the data objects having the lower numeric values are processed after the data objects having the higher numeric values.

5. The system of claim 1, further comprising:
   a counter that counts the quantities of data objects grouped by values of a third dimension; and
   wherein the overlap optimizer processes data objects as prioritized by a count from the counter.

6. The system of claim 1, wherein the operation of the distortion optimizer is represented on the output by a visual slider with a user-movable icon that provides a smooth interpolation mechanism.

7. The system of claim 1, wherein the operation of the overlap optimizer is represented on the output by a visual slider with a user-movable icon that provides a smooth interpolation mechanism.

8. A non-transitory computer-readable storage medium having computer-executable instructions for cell-based data placement to visualize large amounts of multidimensional data on an output, the instructions causing a computer to perform steps comprising:
   sensing a first user input to vary distortion by granting more output space to areas with high data density and less output space to areas with low data density, wherein the first user input is a setting between a no distortion setting and a maximum distortion setting, and
   sensing a second user input to vary overlap of data objects based on a number of data objects already placed at a preferred cell position for the data object, wherein the second user input is a setting between a no overlap setting and a full overlap setting,
   and wherein the output is determined by minimizing a weighted average of a displacement and an overlap error.

9. The non-transitory computer-readable storage medium of claim 8, wherein:
   the data objects are placed according to a first dimension and a second dimension,
   overlapping data objects are rearranged as prioritized by a third dimension, and
   each data object has a numeric value in the third dimension, and the data objects are rearranged in a prioritized manner based on the numeric values of the data objects, such that the data objects having lower numeric values in the third dimension are processed before the data objects having higher numeric values in the third dimension, or such that the data objects having the lower numeric values are processed after the data objects having the higher numeric values.

10. The non-transitory computer-readable storage medium of claim 9, wherein overlapping data objects are rearranged by using a geometric displacement around a preferred cell position for each data object.

11. The non-transitory computer-readable storage medium of claim 8, wherein quantities of data objects grouped by values of a third dimension are counted; and
   overlapping data objects are rearranged as prioritized by a count from the counter.

12. The non-transitory computer-readable storage medium of claim 9, wherein the step of sensing a user input to variably grant more output space uses a visual slider represented on the output, with a user-movable icon that provides a smooth interpolation mechanism.

13. The non-transitory computer-readable storage medium of claim 9, wherein the step of sensing a user input to variably rearrange overlapping data objects uses a visual slider represented on the output, with a user-movable icon that provides a smooth interpolation mechanism.

14. A method implemented on a computer using an algorithm, comprising the steps of:
   (a) rearranging data objects, to a setting between a no distortion setting and a maximum distortion setting, by variably granting more output space to areas with high data density and less output space to areas with low data density, and
   (b) displacing the data objects, to a setting between a no overlap setting and a full overlap setting, by reducing in a variable manner a number of overlapping data objects based on a number of data objects already placed at a preferred cell position for the data object, and wherein the output is determined by minimizing a weighted average of a displacement error and an overlap error.

15. The method of claim 14, wherein the step of displacing the data objects is implemented using a geometric displacement around a preferred cell position for each data object.

16. The method of claim 15, wherein the step of displacing the data objects includes calculating cells of a circle with a line width of two cells.

17. The method of claim 14, wherein:
the data objects are placed according to a first dimension and a second dimension,
the step of displacing the data objects is prioritized by a third dimension, and
each data object has a numeric value in the third dimension, and the data objects are displaced in a prioritized manner based on the numeric values of the data objects, such that the data objects having lower numeric values in the third dimension are processed before the data objects having higher numeric values in the third dimension, or such that the data objects having the lower numeric values are processed after the data objects having the higher numeric values.

18. The method of claim 14, further comprising the step of counting the quantities of data objects grouped by values of a third dimension; and
wherein the step of displacing the data objects is prioritized by a count from the counter.

19. The method of claim 14, wherein the step of rearranging data objects is represented on the output by a visual slider with a user-movable icon that provides a smooth interpolation mechanism.

20. The method of claim 14, wherein the step of displacing the data objects is represented on the output by a visual slider with a user-movable icon that provides a smooth interpolation mechanism.

* * * * *